W. H. LOVE.
ANTISKID DEVICE FOR VEHICLE WHEELS.
APPLICATION FILED JAN. 29, 1921.
1,405,051. Patented Jan. 31, 1922.
2 SHEETS—SHEET 2.
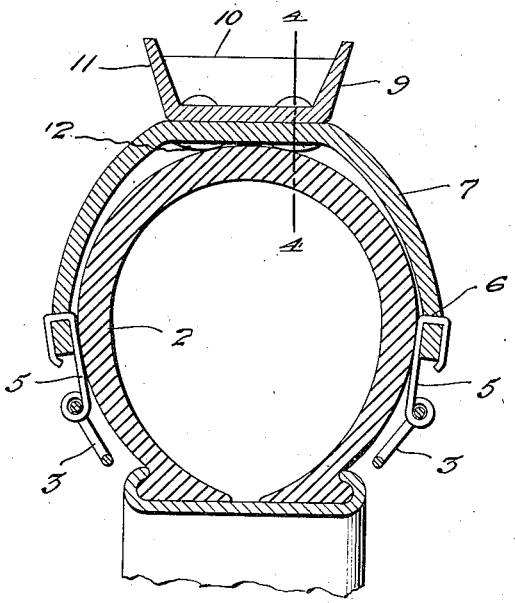
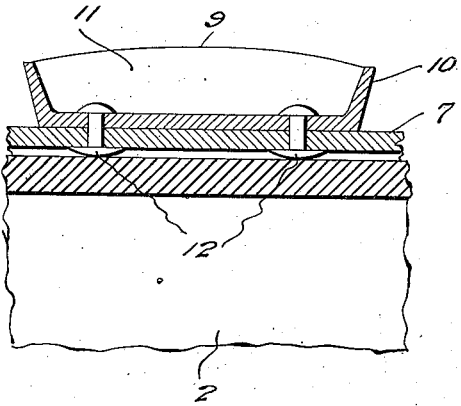
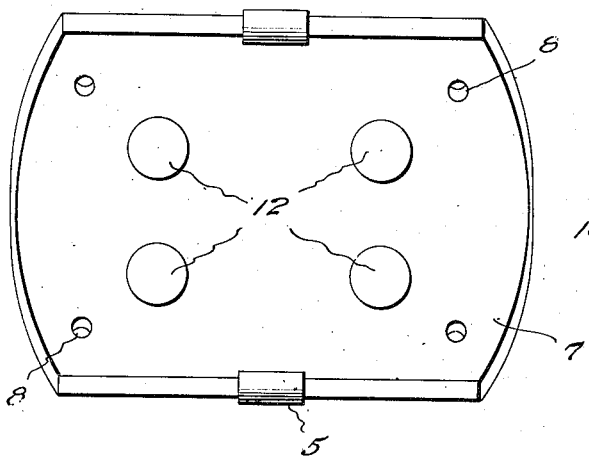
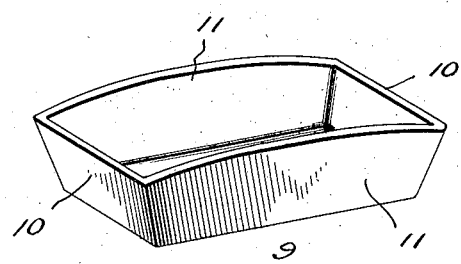
Ward H. Love
INVENTOR
BY Victor J. Evans
ATTORNEY
WITNESS

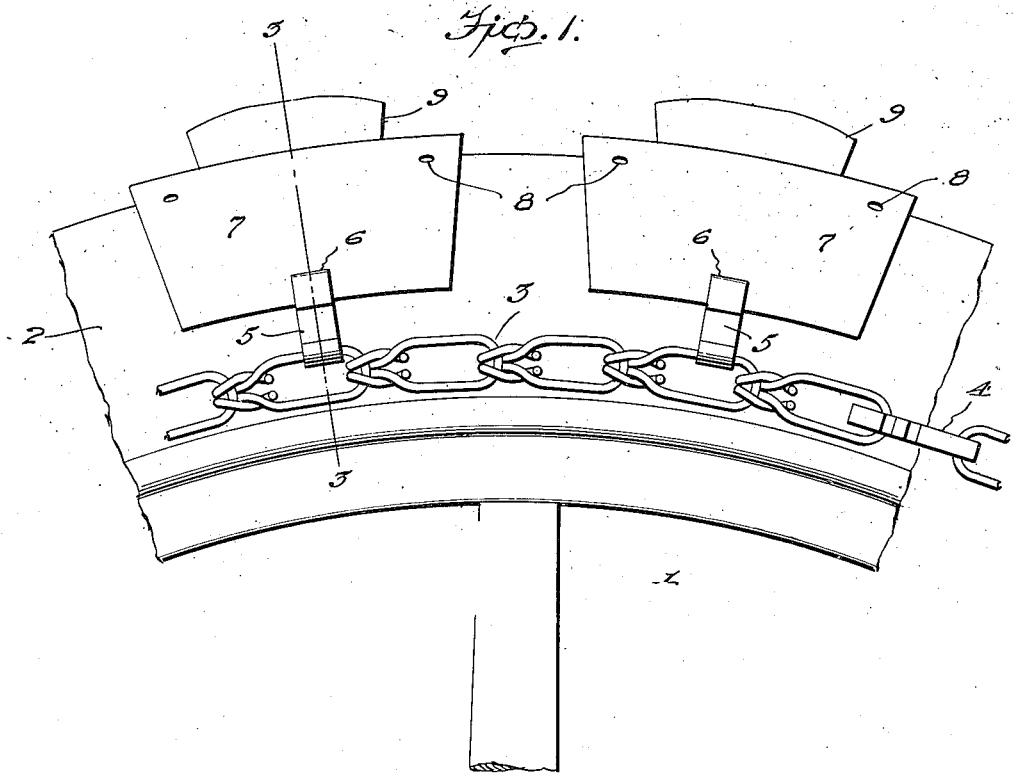
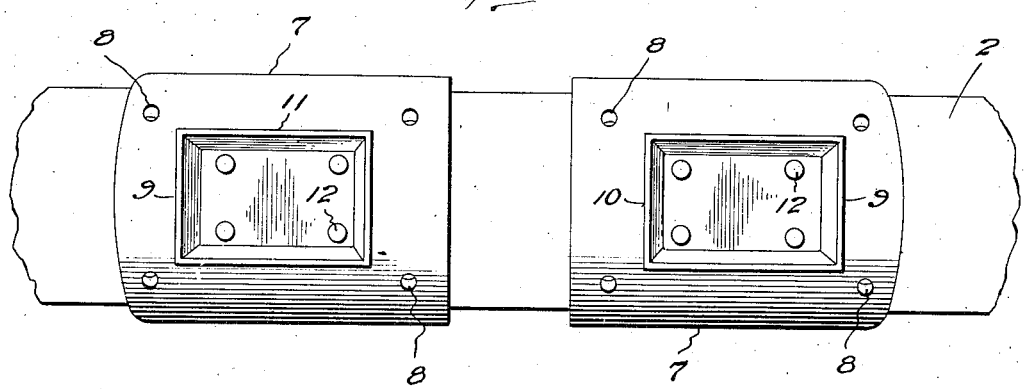

UNITED STATES PATENT OFFICE.

WARD H. LOVE, OF ST. CLAIRSVILLE, OHIO.

ANTISKID DEVICE FOR VEHICLE WHEELS.

1,405,051.  Specification of Letters Patent.  Patented Jan. 31, 1922.

Application filed January 29, 1921. Serial No. 441,009.

*To all whom it may concern:*

Be it known that I, WARD H. LOVE, a citizen of the United States, residing at St. Clairsville, in the county of Belmont and State of Ohio, have invented new and useful Improvements in Antiskid Devices for Vehicle Wheels, of which the following is a specification.

My present invention has reference to an anti-skid device for vehicle wheels.

My object is to produce a device of this character comprising spaced shoe members connected by chains and arranged around a pneumatic tire, each of said shoes having secured thereto calks of a particular and peculiar formation which, engaging with ice or slippery surfaces, will embed themselves therein and positively prevent the wheel from skidding.

A further object is the production of an anti-skidding device for pneumatic tired wheels comprising a plurality of equi-distantly spaced shoes each having on its outer surface a hollow calk whose side walls are arched and of a greater length than the end walls thereof, whereby the said side walls will gradually but firmly embed themselves in icy or other slippery surfaces before the end walls of the calks come in contact with such surfaces, and consequently prevent still further skidding in any direction.

A still further object is the production of an anti-skid device for vehicle wheels including a plurality of equi-distantly spaced shoes connected by chains and arranged circumferentially around a pneumatic tire, each of said shoes being provided with outstanding metallic calks, each of said calks being in the nature of a hollow body whose side walls are of greater length than the end walls thereof, the securing means for the shoes serving as contact members for engagement with the tire casing to more effectively retain the shoes in proper position thereon, while in addition to this, the said shoes are formed with suction openings which assist the securing means for the calks in properly retaining the shoes positioned on the tire.

The foregoing, and other objects which will appear as the nature of the invention is better understood, may be accomplished by a construction, combination and operative arrangement of parts, such as is disclosed by the drawings which accompany and which form part of this application.

In the drawings:—

Figure 1 is a side elevation of a pneumatic tired wheel provided with the improvement.

Figure 2 is an edge view thereof.

Figure 3 is a sectional view on an enlarged scale, and approximately on the line 3—3 of Figure 1.

Figure 4 is a sectional view also on an enlarged scale, and approximately on the line 4—4 of Figure 2.

Figure 5 is a view looking toward the inner face of one of the shoes.

Figure 6 is a perspective view of one of the calks detached from the shoe.

Referring now to the drawings in detail, the numeral 1 designates an ordinary vehicle wheel which is provided with a pneumatic tire 2.

Arranged around the sides, at the beaded edge of the tire, are side chains 3. Suitable means 4 are provided for connecting the end links of the side chains. On certain of the links of the side chains, in equi-distantly spaced relation to each other, are the rounded ends of plates 5. These plates are preferably constructed of bendable metal, but are of sufficient strength to perform the purposes for which they are devised. The plates 5 have their free ends bent and extended through slots 6 adjacent to the edges of fabric shoes 7 which are arranged around the tire. The plates are then bent over the outer faces of the shoes and against the bodies of the said plates. Thus one end of each of the plates is provided with a hook and the other with an eye.

On the outer or tread face of each of the shoes, at the center thereof, there is secured the arched body portion 9 of a calk. The calk is in the nature of a hollow member, having outwardly inclined end walls 10 whose edges are straight, and arched outwardly inclined side walls 11, whose edges are struck at a curvature. The side walls of the calks, at the center thereof, are of a greater length than that of the end walls.

By arranging both the side and end walls at outward inclinations with respect to the body, a more effective gripping surface can be obtained by the calks on the icy surface. By providing the side walls with the rounded or curved engaging edges which are of a greater length than the end walls, the edges of the said side walls will embed themselves in the icy surface before the said surface is engaged by the edges of the angle end walls, and as a consequence, the wheel will be effectively sustained against skidding either longitudinally or laterally. The securing means for the calks are in the nature of bolts, the heads 12 thereof resting on the inner faces of the shoes, and being arranged in contact with the outer surface of the tire serve, in addition with the suction openings, to positively prevent either the lateral or circumferential movement of the shoes on the tire.

It is believed that the foregoing description, when taken in connection with the drawings will fully set forth the construction and advantages of the improvement.

Having described the invention, I claim:—

In combination with a pneumatic tired wheel, of anti-skidding means therefor, comprising side chains arranged against the tire, equi-distantly spaced plates having eye portions engaging certain of the links of the chains, hooks on the outer ends of the plates, fabric shoes arranged over the tire and engaged by the hooks of the plates, and a hollow calk on each of the shoes comprising a member whose side walls are arched and of a greater length at the center thereof than the ends walls of the calk.

In testimony whereof I affix my signature.

WARD H. LOVE.